(12) United States Patent
Savitsky et al.

(10) Patent No.: US 11,315,439 B2
(45) Date of Patent: *Apr. 26, 2022

(54) SYSTEM AND METHOD FOR EXTENDED SPECTRUM ULTRASOUND TRAINING USING ANIMATE AND INANIMATE TRAINING OBJECTS

(71) Applicant: SonoSim, Inc., Santa Monica, CA (US)

(72) Inventors: Eric Savitsky, Malibu, CA (US); Gabriele Nataneli, Los Angeles, CA (US); Dan Katz, Los Angeles, CA (US)

(73) Assignee: SONOSIM, INC., Santa Monica, CA (US)

(*) Notice: Subject to any disclaimer, the term of this patent is extended or adjusted under 35 U.S.C. 154(b) by 248 days.

This patent is subject to a terminal disclaimer.

(21) Appl. No.: 16/538,317

(22) Filed: Aug. 12, 2019

(65) Prior Publication Data

US 2019/0371204 A1     Dec. 5, 2019

Related U.S. Application Data

(63) Continuation of application No. 14/548,210, filed on Nov. 19, 2014, now Pat. No. 10,380,919.

(60) Provisional application No. 61/907,276, filed on Nov. 21, 2013.

(51) Int. Cl.
    *G09B 23/28* (2006.01)
(52) U.S. Cl.
    CPC ................. *G09B 23/286* (2013.01)
(58) Field of Classification Search
    CPC .................................. G09B 23/286

USPC ....................................................... 434/267
See application file for complete search history.

(56) References Cited

U.S. PATENT DOCUMENTS

| | | | |
|---|---|---|---|
| 1,488,233 A | 3/1924 | Diehl |
| 1,762,937 A | 6/1930 | Staud |
| 2,019,121 A | 10/1935 | De Rewal |
| 2,112,019 A | 3/1938 | Gyger |
| 2,127,610 A | 8/1938 | Moore |
| 2,705,049 A | 3/1955 | Brooks |
| 2,705,307 A | 3/1955 | Nyswander |
| 2,722,947 A | 11/1955 | Sragal |
| 2,886,316 A | 5/1959 | Ayala |
| 4,040,171 A | 8/1977 | Cline et al. |
| 4,838,863 A | 6/1989 | Allard et al. |
| 4,838,869 A | 6/1989 | Allard |

(Continued)

FOREIGN PATENT DOCUMENTS

| | | |
|---|---|---|
| EP | 1103223 A2 | 5/2001 |
| EP | 2801966 | 11/2014 |

(Continued)

OTHER PUBLICATIONS

Chung, Gregory, "Effects of Simulation-Based Practice on Focused Assessment . . . ", Military Medicine, Oct. 2013, vol. 178.

(Continued)

*Primary Examiner* — Robert P Bullington, Esq.
(74) *Attorney, Agent, or Firm* — Cislo & Thomas, LLP

(57) ABSTRACT

A system and method for extended spectrum ultrasound training using tags placed on animate and/or inanimate objects. The system combines the use of tags, a reader, and a 3-DOF motion tracker to train a user in finding image windows and optimal image views in an ultrasound simulation environment.

19 Claims, 8 Drawing Sheets

(56) References Cited

U.S. PATENT DOCUMENTS

| | | |
|---|---|---|
| 4,994,034 A | 2/1991 | Botich et al. |
| 5,231,381 A | 7/1993 | Duwaer |
| 5,513,992 A | 5/1996 | Refait |
| 5,609,485 A * | 3/1997 | Bergman ............ G01S 7/52055 434/262 |
| 5,678,565 A | 10/1997 | Sarvazyan |
| 5,689,443 A | 11/1997 | Ramanathan |
| 5,701,900 A | 12/1997 | Shehada et al. |
| 5,704,791 A | 1/1998 | Gillio |
| 5,755,577 A | 5/1998 | Gillio |
| 5,767,839 A | 6/1998 | Rosenberg |
| 5,776,062 A | 7/1998 | Nields |
| 5,791,908 A | 8/1998 | Gillio |
| 5,800,177 A | 9/1998 | Gillio |
| 5,800,178 A | 9/1998 | Gillio |
| 5,800,179 A | 9/1998 | Bailey |
| 5,800,350 A | 9/1998 | Coppleson |
| 5,827,942 A | 10/1998 | Madsen et al. |
| 5,882,206 A | 3/1999 | Gillio |
| 5,889,237 A | 3/1999 | Makinwa |
| 5,934,288 A | 8/1999 | Avila et al. |
| 6,001,472 A | 12/1999 | Ikeda et al. |
| 6,048,312 A | 4/2000 | Ishrak et al. |
| 6,063,030 A | 5/2000 | Vara et al. |
| 6,068,597 A | 5/2000 | Lin |
| 6,074,213 A | 6/2000 | Hon |
| 6,113,395 A | 9/2000 | Hon |
| 6,117,078 A | 9/2000 | Lysyansky et al. |
| 6,122,538 A | 9/2000 | Sliwa, Jr. et al. |
| 6,156,213 A | 12/2000 | Dudley et al. |
| 6,193,657 B1 | 2/2001 | Drapkin |
| 6,267,599 B1 | 7/2001 | Bailey |
| 6,468,212 B1 | 10/2002 | Scott et al. |
| 6,502,756 B1 | 1/2003 | Fåhraeus |
| 6,511,427 B1 | 1/2003 | Sliwa, Jr. et al. |
| 6,548,768 B1 | 4/2003 | Pettersson et al. |
| 6,570,104 B1 | 5/2003 | Ericson et al. |
| 6,654,000 B2 | 11/2003 | Rosenberg |
| 6,663,008 B1 | 12/2003 | Pettersson et al. |
| 6,665,554 B1 | 12/2003 | Charles et al. |
| 6,666,376 B1 | 12/2003 | Ericson |
| 6,667,695 B2 | 12/2003 | Pettersson |
| 6,674,427 B1 | 1/2004 | Pettersson et al. |
| 6,689,966 B2 | 2/2004 | Wiebe |
| 6,693,626 B1 | 2/2004 | Rosenberg |
| 6,694,163 B1 | 2/2004 | Vining |
| 6,698,660 B2 | 3/2004 | Fåhraeus et al. |
| 6,714,213 B1 | 3/2004 | Lithicum et al. |
| 6,714,901 B1 | 3/2004 | Cotin et al. |
| 6,719,470 B2 | 4/2004 | Berhin |
| 6,722,574 B2 | 4/2004 | Skantze et al. |
| 6,732,927 B2 | 5/2004 | Olsson et al. |
| 6,750,877 B2 | 6/2004 | Rosenberg et al. |
| 6,780,016 B1 | 8/2004 | Toly |
| 6,816,148 B2 | 11/2004 | Mallett et al. |
| 6,836,555 B2 | 12/2004 | Ericson et al. |
| 6,854,821 B2 | 2/2005 | Ericson et al. |
| 6,864,880 B2 | 3/2005 | Hugosson et al. |
| 6,878,062 B2 | 4/2005 | Bjorklund et al. |
| 6,896,650 B2 | 5/2005 | Tracey et al. |
| 6,916,283 B2 | 7/2005 | Tracey et al. |
| 6,927,916 B2 | 8/2005 | Craven-Bartle |
| 6,929,183 B2 | 8/2005 | Pettersson |
| 6,929,481 B1 | 8/2005 | Alexander |
| 6,947,033 B2 | 9/2005 | Fåhraeus et al. |
| 6,958,747 B2 | 10/2005 | Sahlberg et al. |
| 6,966,495 B2 | 11/2005 | Lynggaard et al. |
| 6,992,655 B2 | 1/2006 | Ericson et al. |
| 7,002,559 B2 | 2/2006 | Ericson |
| 7,035,429 B2 | 4/2006 | Andreasson |
| 7,037,258 B2 | 5/2006 | Chatenever et al. |
| 7,050,653 B2 | 5/2006 | Edso et al. |
| 7,054,487 B2 | 5/2006 | Ericson et al. |
| 7,072,529 B2 | 7/2006 | Hugosson et al. |
| 7,089,308 B2 | 8/2006 | Fransson et al. |
| 7,094,977 B2 | 8/2006 | Ericson et al. |
| 7,110,604 B2 | 9/2006 | Olsson |
| 7,120,320 B2 | 10/2006 | Petterson et al. |
| 7,121,465 B2 | 10/2006 | Rignell |
| 7,127,682 B2 | 10/2006 | Sandstrom et al. |
| 7,143,952 B2 | 12/2006 | Ericson |
| 7,145,556 B2 | 12/2006 | Pettersson |
| 7,154,056 B2 | 12/2006 | Bergqvist et al. |
| 7,162,087 B2 | 1/2007 | Bryborn |
| 7,167,164 B2 | 1/2007 | Ericson et al. |
| 7,172,131 B2 | 2/2007 | Pettersson et al. |
| 7,175,095 B2 | 2/2007 | Pettersson et al. |
| 7,176,896 B1 | 2/2007 | Fahraeus et al. |
| 7,180,509 B2 | 2/2007 | Fermgard et al. |
| 7,195,166 B2 | 3/2007 | Olsson et al. |
| 7,202,861 B2 | 4/2007 | Lynggaard |
| 7,202,963 B2 | 4/2007 | Wiebe et al. |
| 7,239,306 B2 | 7/2007 | Fahraeus et al. |
| 7,246,321 B2 | 7/2007 | Bryborn et al. |
| 7,248,250 B2 | 7/2007 | Pettersson et al. |
| 7,249,256 B2 | 7/2007 | Hansen et al. |
| 7,249,716 B2 | 7/2007 | Bryborn |
| 7,254,839 B2 | 8/2007 | Fahraeus et al. |
| 7,278,017 B2 | 10/2007 | Skantze |
| 7,281,668 B2 | 10/2007 | Pettersson et al. |
| 7,283,676 B2 | 10/2007 | Olsson |
| 7,293,697 B2 | 11/2007 | Wiebe et al. |
| 7,295,193 B2 | 11/2007 | Fahraeus |
| 7,296,075 B2 | 11/2007 | Lynggaard |
| 7,321,692 B2 | 1/2008 | Bryborn et al. |
| 7,333,947 B2 | 2/2008 | Wiebe et al. |
| 7,345,673 B2 | 3/2008 | Ericson et al. |
| 7,353,393 B2 | 4/2008 | Hansen et al. |
| 7,356,012 B2 | 4/2008 | Wiebe et al. |
| 7,371,068 B2 | 5/2008 | Lloyd et al. |
| 7,382,361 B2 | 6/2008 | Burstrom |
| 7,385,595 B2 | 6/2008 | Brybomn et al. |
| 7,408,536 B2 | 8/2008 | Hugosson et al. |
| 7,415,501 B2 | 8/2008 | Burstrom |
| 7,418,160 B2 | 8/2008 | Lynggaard |
| 7,422,154 B2 | 9/2008 | Ericson |
| 7,441,183 B2 | 10/2008 | Burstrom et al. |
| 7,457,413 B2 | 11/2008 | Thuvesholmen et al. |
| 7,457,476 B2 | 11/2008 | Olsson |
| 7,543,753 B2 | 6/2009 | Pettersson |
| 7,588,191 B2 | 9/2009 | Pettersson et al. |
| 7,600,693 B2 | 10/2009 | Pettersson |
| 7,649,637 B2 | 1/2010 | Wiebe et al. |
| 7,670,070 B2 | 3/2010 | Craven-Bartle |
| 7,672,513 B2 | 3/2010 | Bjorklund et al. |
| 7,701,446 B2 | 4/2010 | Sahiberg et al. |
| 7,710,408 B2 | 5/2010 | Ericson |
| 7,751,089 B2 | 7/2010 | Fahraeus et al. |
| 7,753,283 B2 | 7/2010 | Lynggaard |
| 7,777,777 B2 | 8/2010 | Bowman et al. |
| 7,788,315 B2 | 8/2010 | Johansson |
| 7,794,388 B2 | 9/2010 | Draxinger et al. |
| 7,806,696 B2 | 10/2010 | Alexander |
| 7,833,018 B2 | 11/2010 | Alexander |
| 7,850,454 B2 | 12/2010 | Toly |
| 7,857,626 B2 | 12/2010 | Toly |
| 7,871,850 B2 | 1/2011 | Park |
| 7,931,470 B2 | 4/2011 | Alexander |
| 8,244,506 B2 | 8/2012 | Butsev |
| 8,294,972 B2 | 10/2012 | Chung |
| 8,428,326 B2 | 4/2013 | Falk |
| 8,480,404 B2 | 7/2013 | Savitsky |
| 8,480,406 B2 | 7/2013 | Alexander |
| 8,721,344 B2 | 5/2014 | Marmaropoulos |
| 9,128,116 B2 | 9/2015 | Welch et al. |
| 9,251,721 B2 | 2/2016 | Lampotang |
| 9,870,721 B2 | 1/2018 | Savitsky et al. |
| 10,052,010 B2 | 8/2018 | Feddema |
| 10,132,015 B2 | 11/2018 | Woodruff et al. |
| 11,011,077 B2 | 5/2021 | Garcia Kilroy |
| 2001/0031920 A1 | 10/2001 | Kaufman et al. |
| 2002/0076581 A1 | 6/2002 | McCoy |
| 2002/0076681 A1 | 6/2002 | Leight et al. |
| 2002/0088926 A1 | 7/2002 | Prasser |

(56) References Cited

U.S. PATENT DOCUMENTS

| | | |
|---|---|---|
| 2002/0099310 A1 | 7/2002 | Kimchy et al. |
| 2002/0168618 A1 | 11/2002 | Anderson et al. |
| 2002/0173721 A1 | 11/2002 | Grunwald et al. |
| 2004/0043368 A1 | 3/2004 | Hsieh et al. |
| 2004/0087850 A1 | 5/2004 | Okerlund et al. |
| 2005/0119569 A1 | 6/2005 | Ontake |
| 2005/0181342 A1 | 8/2005 | Toly |
| 2005/0214726 A1 | 9/2005 | Feygin et al. |
| 2005/0283075 A1 | 12/2005 | Ma et al. |
| 2006/0020204 A1 | 1/2006 | Serra et al. |
| 2006/0098010 A1 | 5/2006 | Dwyer et al. |
| 2007/0088213 A1 | 4/2007 | Poland |
| 2007/0232907 A1 | 10/2007 | Pelissier et al. |
| 2007/0236514 A1 | 10/2007 | Augusanto |
| 2007/0238085 A1 | 10/2007 | Colvin et al. |
| 2008/0137071 A1 | 6/2008 | Chow |
| 2008/0187896 A1 | 8/2008 | Savitsky |
| 2008/0200807 A1 | 8/2008 | Wright et al. |
| 2008/0204004 A1 | 8/2008 | Anderson |
| 2008/0269606 A1 | 10/2008 | Matsumura |
| 2008/0294096 A1 | 11/2008 | Uber et al. |
| 2008/0312884 A1 | 12/2008 | Hostettler et al. |
| 2009/0043195 A1 | 2/2009 | Poland |
| 2009/0046912 A1 | 2/2009 | Hostettler |
| 2009/0130642 A1 | 5/2009 | Tada |
| 2009/0305213 A1 | 12/2009 | Burgkart et al. |
| 2009/0311655 A1 | 12/2009 | Karkanias et al. |
| 2010/0055657 A1 | 3/2010 | Goble et al. |
| 2010/0104162 A1 | 4/2010 | Falk et al. |
| 2010/0179428 A1 | 7/2010 | Pedersen et al. |
| 2010/0268067 A1 | 10/2010 | Razzaque et al. |
| 2010/0277422 A1 | 11/2010 | Muresianu et al. |
| 2012/0021993 A1 | 1/2012 | Kim et al. |
| 2012/0143142 A1 | 6/2012 | Klein |
| 2012/0150797 A1 | 6/2012 | Landy et al. |
| 2012/0179039 A1 | 7/2012 | Pelissier et al. |
| 2012/0200977 A1 | 8/2012 | Nestler |
| 2012/0219937 A1 | 8/2012 | Hughes et al. |
| 2012/0238875 A1 | 9/2012 | Savitsky et al. |
| 2012/0251991 A1 | 10/2012 | Savitsky et al. |
| 2013/0046523 A1 | 2/2013 | Van Dinther |
| 2013/0064036 A1 | 3/2013 | Lee et al. |
| 2013/0065211 A1 | 3/2013 | Amso |
| 2013/0158411 A1 | 6/2013 | Miyasaka |
| 2013/0179306 A1* | 7/2013 | Want ................. G06Q 20/3278 705/26.81 |
| 2013/0236872 A1 | 9/2013 | Laurusonis et al. |
| 2014/0087347 A1 | 3/2014 | Tracy |
| 2014/0114194 A1 | 4/2014 | Kanayama et al. |
| 2014/0120505 A1 | 5/2014 | Rios et al. |
| 2014/0228685 A1 | 8/2014 | Eelbode |
| 2014/0272878 A1 | 9/2014 | Shim et al. |
| 2015/0056591 A1 | 2/2015 | Tepper et al. |
| 2015/0213731 A1 | 7/2015 | Sato |
| 2016/0314716 A1 | 10/2016 | Grubbs |
| 2016/0328998 A1 | 11/2016 | Pedersen et al. |
| 2017/0028141 A1 | 2/2017 | Fiedler et al. |
| 2017/0035517 A1 | 2/2017 | Geri |
| 2017/0046985 A1 | 2/2017 | Hendrickson et al. |
| 2017/0110032 A1 | 4/2017 | O'Brien |
| 2017/0270829 A1 | 9/2017 | Bauss |
| 2018/0197441 A1 | 7/2018 | Rios |
| 2018/0366034 A1 | 12/2018 | Casals Gelpi |
| 2019/0057620 A1 | 2/2019 | Eggert |
| 2019/0231436 A1 | 8/2019 | Panse |
| 2020/0126449 A1 | 4/2020 | Horst |

FOREIGN PATENT DOCUMENTS

| | | |
|---|---|---|
| EP | 2801966 A1 | 11/2014 |
| RU | 2127610 C1 | 3/1999 |
| RU | 1994040171 | 11/2014 |
| WO | 2006960406 A1 | 6/2006 |

OTHER PUBLICATIONS

Aligned Management Associates, Inc., Corporate home page describing organizing committee, overview, Procedicus MIST[trademark]-suturing module 30.0, 6 pgs., obtained from website Sep. 6, 2004.

American Academy of Emergency Medicine, conference: 11th annual scientific assembly preconference ultrasound courts, http://www.aaem.org/education/scientificassembly/sa05/precon/ultrasound.shtmi, 6 pgs, obtained from website Feb. 16, 2005.

Barbosa, J et al., "Computer education in emergency medicine residency programs," http://www.med-ed-oniine.org/res00002.htm, 8 pgs, obtained from website Sep. 6, 2004.

Brannam, Let al, "Emergency nurses utilization of ultrasound guidance for placement of peripheral intravenous lines in difficult-access patients," Acad Emerg Med, 11 (12):1361-1363, Dec. 2004.

Calvert, N et al., "The effectiveness and cost-effectiveness of ultrasound locating devices for central venous access: a systematic review and economic evaluation/executive summary," Health Tech Assess 2003, 7(12), 4 pgs.

Center for Human Simulation, corporate home page describing overview/people, http://www.uchsc.edu, 7 pgs, obtained from website Sep. 6, 2004.

CIMIT News, "The medical access program: new CIMIT initiative to benefit underserved patients/partners telemedicine and CIMIT launch new initiative: stay connected, be healthy/highlights: operating room of the future plug-and-play project," http://www.cimit.org, Jan. 2005; VoIII(2), 2 pgs., obtained from website Mar. 1, 2005.

Colt, H. G. et al., "Virtual reality bronchoscopy simulation: a revolution in procedural training," Chest 2001; 120:1333-1339.

Computer Motion, "About computer motion: technology to enhance surgeons capabilities, improve patient outcomes and reduce healthcare costs/corporate alliances/products solutions for surgical innovation/training on the da Vinci[registered] surgical system-introduction," 2002 Computer Motion, http://www.computermotion.com, 6 pgs.

Delp, Setal, "Surgical simulation—an emerging technology for training in emergency medicine," Presence, 6(2):147-159, Apr. 1997 (abstract).

Dorner, R. et. al., "Synergies between interactive training simulations and digital storytelling: a component-based framework," Computer Graphics, 26(1):45-55, Feb. 2002 (abstract).

Duque, D. and Kessler S., "Ultrasound guided vascular access," Amer Coll Emerg Phy., http://vww.nyacep.org/education/articles/ultrasound%20vascular%20access.htm, 2 pgs, obtained from website May 11, 2005.

Espinet, A. and Dunning J., "Does ultrasound-guided central line insertion reduce complications and time to placement in elective patients undergoing cardiac surgery," Inter Cardiovascular Thoracic Surg, 3:523-527, 2004; http://licvts.ctsnetjournals.org/cgi/content/full/3/3/523, 6 pgs, obtained from website May 11, 2005 (abstract).

Gallagher, A. G. et al., "Virtual reality training for the operating room and cardiac catheterization laboratory," Lancet, 364:1538-1540, Oct. 23, 2004.

Gallagher, A. G. et. ai., "Psychomotor skills assessment in practicing surgeons experienced in performing advanced laparoscopic procedures," AM Coll Surg, 197(3):479-488, Sep. 2003.

Gausche, M. et al., "Effect on out-of-hospital pediatric endotracheal intubation on survival and neurological outcome: a controlled clinical trial," JAMA, 283(6):783-790, Feb. 9, 2000.

Gore, D. C. and Gregory, S. R., "Historical perspective on medical errors: Richard Cabot and the Institute of Medicine," J Amer Coll Surg, 197(4), 5 pgs, Oct. 2003.

Grantcharov, T. P. et. al., "Randomized clinical trial of virtual reality simulation for laparoscopic skills training," Br J Surg, 91(2):146-150, Feb. 1, 2004 (abstract).

Grantcharov, T. P. et al., "Learning curves and impact of previous operative experience on performance on a virtual reality simulator to test laparoscopic surgical skills," Am J Surg, 185(2):146-149, Feb. 1, 2004 (abstract).

Haluck, R. S., et. al., "Are surgery training programs ready for virtual reality A survey of program directors in general surgery," Arch Surg, 135(7):786-792, Jul. 1, 2000.

(56) References Cited

OTHER PUBLICATIONS

Helmreich, R. L., "On error management: lessons from aviation," BMJ, 320:781-785, Mar. 2000.
Huckman, R. S. and Pisano, G. P., "Turf battles in coronary revascularization," N Engl J Med, http://www.nejm.org, 4 pgs, 352(9):857-859, Mar. 3, 2005.
Immersion Corporation, URL: http://www.immersion.com/corporate/products/, corporate home page describing Immersions surgical training simulators—"Wireless Data Glove: The CyberGlove[registered]II System," 5 pgs, obtained from the website Nov. 17, 2005 and Jan. 24, 2008.
injuryboard.com, "Reducing complications associated with central vein catheterization," URSL: http://www.injuryboard.com/view.cfm/Article=668, 5 pgs, obtained from website May 11, 2005.
Intersense, home page listing motion tracking products, http://www.isense.com/prodouts.aspxid=42, 1 pg, obtained from website Jan. 24, 2008.
Jemmett, M. E., et al., "Unrecognized misplacement of endotracheal tubes in a mixed urban to rural emergency medical services setting," Acad Emerg Med, 10(9):961-964, Sep. 2003.
Katz, S. H. and Falk, J. L., "Misplaced endotrachial tubes by paramedics in an urban medical services system," Annals Emerg Med, 37:32-37, Jan. 2001.
Lewis, R., "Educational research: time to reach the bar, not lower it," Acad Emerg Med, 12(3):247-248, Mar. 2005.
Liu, A. et, al., "A survey of surgical simulation: applications, technology, and education," Presence, 12(6):1-45, Dec. 2003.
Manchester Visulations Centre, "Webset project-bringing 3D medical training tools to the WWW," http://www.sve.man.ac.uklmvc/research/previous/website, 3 pgs, obtained from the website Sep. 8, 2004.
Mclellan, H., "Virtual realities," Mclellan Wyatt Digital, 33 pgs.
Medical Simulation Corporation, corporate home page describing management team/frequertly asked questions, http://www.medsimulation.com/about_msc/key_employees.asp, 7 pgs, obtained from website Nov. 25, 2004.
Medtronic, "The StealthStation[registered] treatment guidance system," the corporate home page describing the company fact sheet and profile; http://www.medtronic.com/Newsroom, 4 pgs, obtained from website Mar. 5, 2005.
Mort, T. C., "Emergency trachea! intubation: complications associated with repeated laryngoscopic attempts," Anesth Analg, 99(2):607-613, Aug. 2004, 1 pg, obtained from website Sep. 8, 2004 (abstract).
Nazeer, S. R., et al., "Ultrasound-assisted paracentesis performed by emergency physicians v.s. the traditional technique: a prospective, randomized study," Amer J of Emer Med, 23:363-367, 2005.
NCA Medical Simulation Center, Tutorial—simulation for medical training, http://Simcen.usuhs.millmiccaie, 4 pgs, 2003.
Next Dimension Imaging, "Products-Anatomy Analyzer 2," http://www.nexted.com/anatomyanalyzer.asp, 2 pgs, obtained from website Dec. 7, 2004.
Norris, T. E. et al., "Teaching procedural skills," J General Internal Med, 12(S2):S64-S70, Apr. 1997.
On the Net Resources-Education and Training, URL: http://www.hitl.washington.edu/projects/knowledge_base/education.html, corporate home page regarding internet sites regarding education and training, 16 pgs, obtained from website Jan, 8, 2005.
Osberg, K. M., "Virtual reality and education: a look at both sides of the sword," http://www.hitl.washington.edu/publications/r-93-7/, 19 pgs, Dec. 14, 1992, obtained from website Jan. 21, 2008.
Osmon, S. et al., "Clinical investigations: reporting of medical errors: an intensive care unit experience," Grit Care Med, 32(3), 13 pgs, Mar. 2004.
Ponder, M., et al., "Immersive VR decision training: telling interactive stories featuring advanced human simulation technologies," Eurographics Association 2003, 10 pgs.
PRIMAL, corporate home page describing resources forteaching healthcare practitioners, 2 pgs, obtained from website.
Prystowsky, J. B. et al., "A virtual reality module for intravenous catheter placement," Am J Surg 1999; 177 (2):171-175 (abstract).
Reachin, "Medical Training Development Centre/Reachin technologies AB has entered into a corporation with Mentice AB," Jan. 20, 2004, 4 pgs, obtained from website Nov. 9, 2004.
Rothschild, J. M., "Ultrasound guidance of central vein catheterization," NCBI, Nat Lib Med, www.ncbi.nlm.nih.gov/books/, HSTAT 21, 6 pgs, obtained from website May 11, 2005.
Rowe, R. and Cohen, R. A., "An evaluation of a virtual reality airway simulator," Anesth Analg 2002, 95:62-66.
Sensable Technologies, "Phantom Omni Haptic Device," 2 pgs, http://www.sensable.com/haptic-ohantom-omni.htm., obtained from website Jan. 24, 2008.
Shaffer, K., "Becoming a physician: teaching anatomy in a digital age," NEJM, Sep. 23, 2004; 351(13):1279-81 Kextract of first 100 words—no abstract).

\* cited by examiner

SYSTEM AND METHOD FOR EXTENDED SPECTRUM ULTRASOUND TRAINING USING ANIMATE AND INANIMATE TRAINING OBJECTS

CROSS-REFERENCE TO RELATED APPLICATION

This patent application is a continuation of U.S. patent application Ser. No. 14/548,210, filed Nov. 19, 2014, which claims the benefit of U.S. Provisional Patent Application Ser. No. 61/907,276, filed Nov. 21, 2013, entitled "SYSTEM AND METHOD FOR EXTENDED SPECTRUM ULTRASOUND TRAINING USING ANIMATE AND INANIMATE TRAINING OBJECTS," which applications are incorporated in their entirety here by this reference.

STATEMENT REGARDING FEDERALLY SPONSORED RESEARCH

This invention was made with government support under Contract No. W81XWH-11-C-0529 awarded by the US Army Medical Research and Material Command. The government has certain rights in the invention.

TECHNICAL FIELD

This invention relates to extending the capabilities of ultrasound training simulation to support traditional modalities based on animate (e.g., live human model) and inanimate (e.g., training mannequins) objects.

BACKGROUND

The acquisition of ultrasound skills requires ability of finding an image window i.e., placing the ultrasound transducer over a site of interest that also enables acoustic sound wave transmission towards the structure of interest). Upon finding an image window, the operator must acquire an optimal view. This typically involves rotation of the transducer around a fixed axis or point. Both of these skills require practice and the development of psychomotor skills that are married to didactic instruction and an understanding of underlying anatomy. Therefore, an effective tool for learning ultrasound must allow the user to practice both rotational and translational movements of the ultrasound probe. This invention introduces a low-cost solution that allows users to practice the skills of image window and optimal view acquisition in a simulated environment.

Methods of ultrasound simulation have been developed that force trainees to both locate an image window and subsequently find an optimal image view. These methods rely upon complex six degrees-of-freedom (6DOF) motion tracking technologies coupled with inanimate mannequins. Issues of calibration, cost, interference, and ease-of-use issues make 6-DOF ultrasound simulations expensive and cumbersome. Many institutions and individuals who wish to teach or learn ultrasonography do not have access to expensive training mannequins equipped with 6-DOF motion sensing technology.

For the foregoing reasons there is a need for a more accessible system and method for ultrasound simulation that does not require expensive 6-DOF motion sensing technology.

SUMMARY

The present invention is directed to a system and method of ultrasound training that uses Near Field Communication (NFC) tags or similar radio frequency tags that may be placed on animate or inanimate models to define desired locations over the extent of the body that are linked to pre-selected image windows. Trainees use an NFC reader coupled with a rotational 3-DOF motion tracker to manipulate a virtual ultrasound probe. Ultrasound simulation software displays a graphical user interface, a virtual body, the virtual ultrasound probe, and an ultrasound image. The virtual ultrasound probe and ultrasound image continuously update based on the manipulation of the reader and the 3-DOF motion tracker. In this way trainees may train in finding image windows and optimal image views.

DETAILED DESCRIPTION OF THE INVENTION

Figure 1:
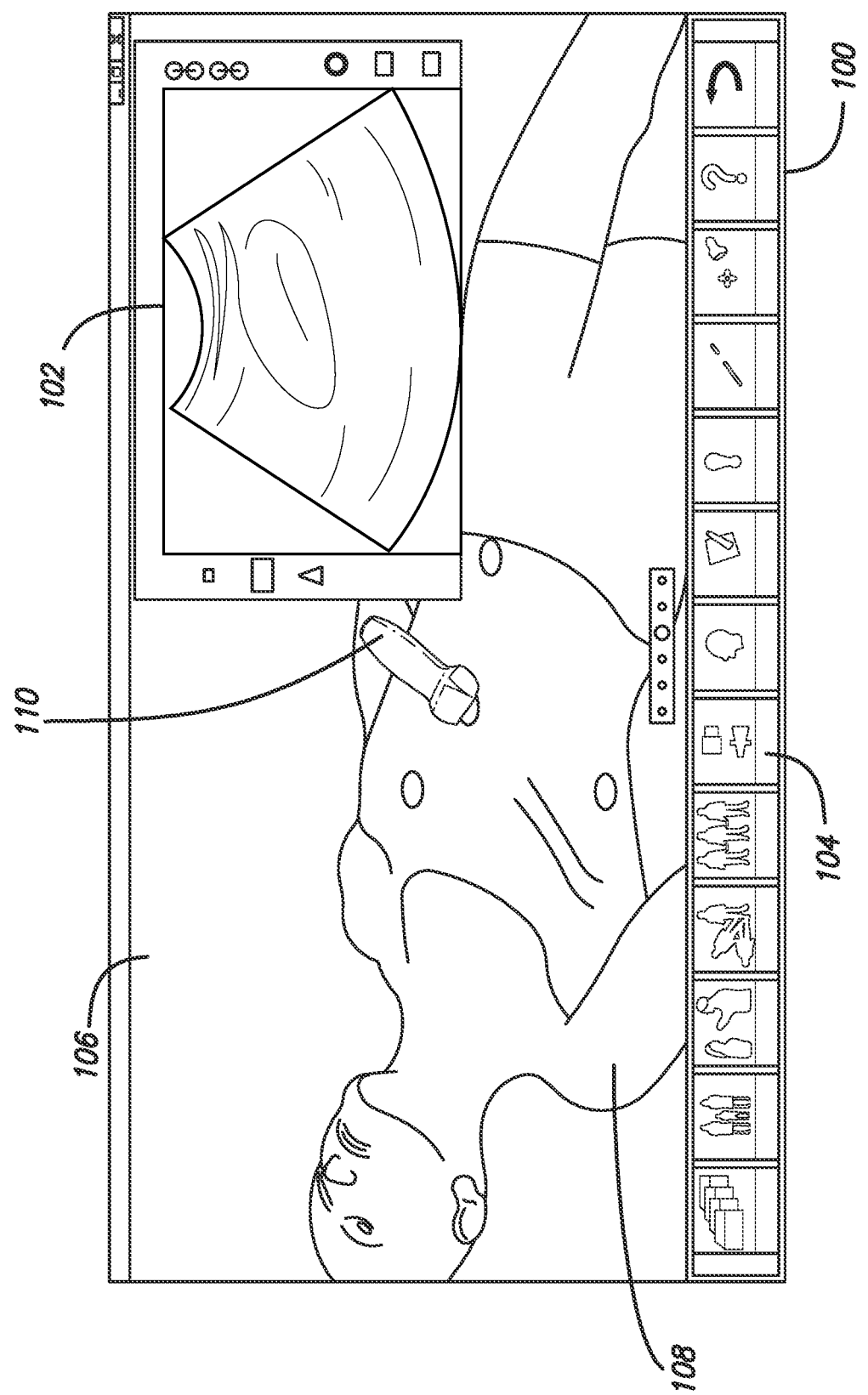
FIG. 1 shows an ultrasound simulation display in accordance with embodiments of the present disclosure.

The detailed description set forth below connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention and claims.

It will be understood that, although the terms first, second, etc. may be used herein to describe various elements, these elements should not be limited by these terms. These terms are only used to distinguish one element from another. For example, a first gesture could be termed a second gesture, and, similarly, a second gesture could be termed a first gesture, without departing from the scope of the present invention.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The term 6-DOF means six degrees of freedom and refers to the freedom of movement of a rigid body in three-dimensional space. Specifically, the body is free to move in three translational degrees of forward/back, up/down, left/right, and three rotational degrees of pitch, yaw, and roll. The term rotational 3-DOF refers to the pitch, yaw, and roll.

The term tag is used herein to refer to both transponders and beacons. Generally, NFC, RFID, and other types of passive tags are referred to transponders, and active tags such as ones using Bluetooth Low Energy are referred to as beacons.

The term reader is used to refer to the device that emits the query signal to detect the ID of the tag.

A preferred embodiment of the extended-spectrum ultrasound simulation system comprises:
  an animate or inanimate training object 204, 302, or 402 that serves as a scanning surface;
  a set of labeled tags 202 that contain the requisite hardware to respond to queries from a reader;
  a reader that is compatible with the available collection of tags 202;
  a rotational 3-DOF motion tracker to control the orientation of the scanning plane in an ultrasound simulator;
  a component to relay information from the motion tracker and reader to the computation engine;
  an ultrasound simulator technology that runs on the computation engine and provides a training environment for teaching how to select a correct image window and acquire an optimal view;
  A virtual body 108 that serves as a simulated counterpart to the animate or inanimate training object with affixed tags 202; and
  a tool to define a mapping between tags 202 and positions on the virtual body 108.

Embodiments of the ultrasound training method involve providing the hardware and software of the extended-spectrum ultrasound simulation system and directing the trainee 206 in the use of the system. This method would assist a trainee 206 in acquiring the skills of finding an image window and an optimal image view. The method may comprise a setup step in which the trainee 206 places tags 202 on an animate or inanimate training object. After the setup step, the trainee 206 may begin the simulation, which involves moving the reader and motion tracker, while viewing on a display 100 a virtual body 108, virtual ultrasound probe 110, and a simulated ultrasound 102, as depicted in FIG. 1.

Figure 2:
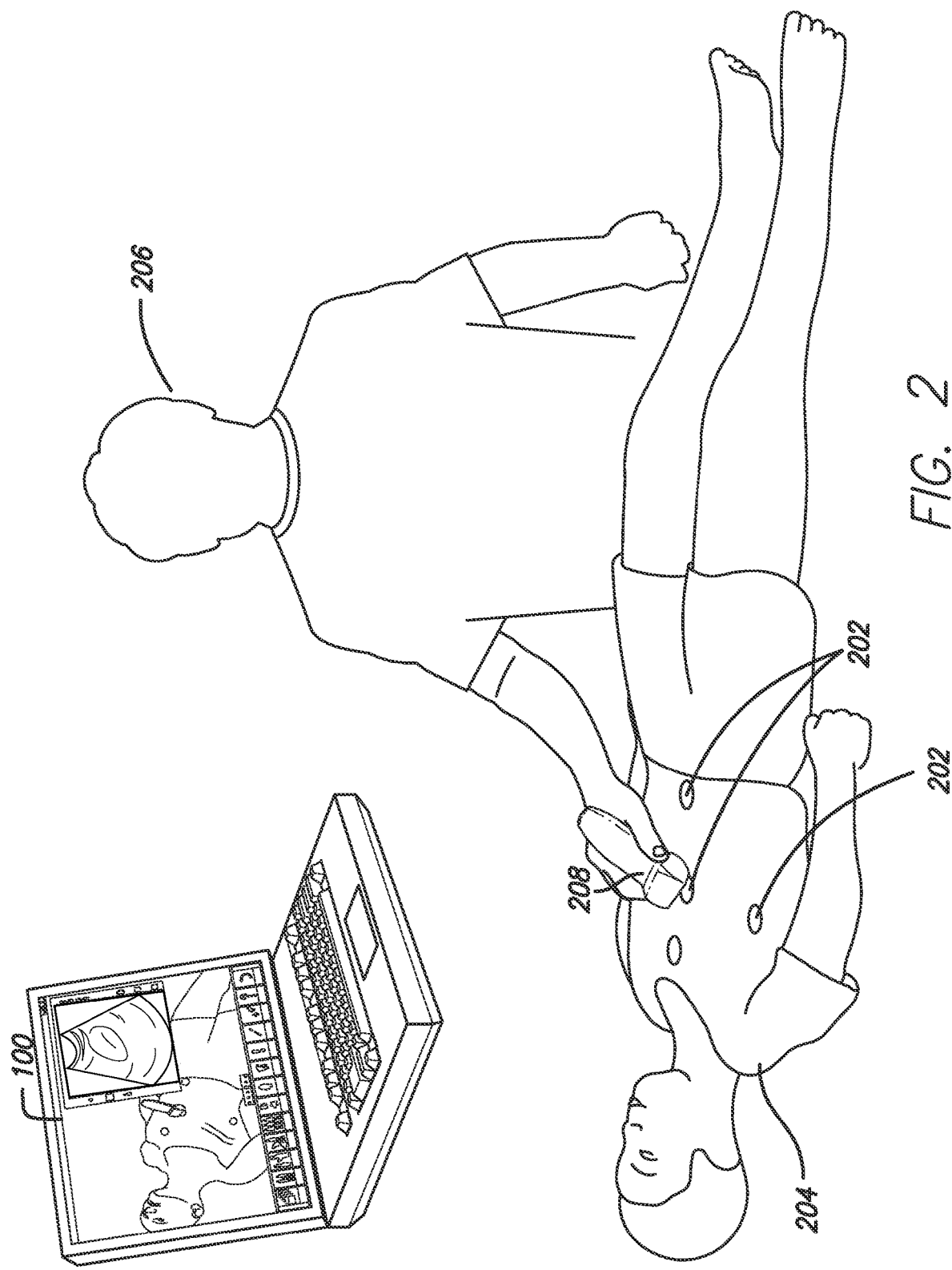
FIG. 2 shoes a perspective view of a person training on an animate training object in accordance with embodiments of the present disclosure.
Figure 3:
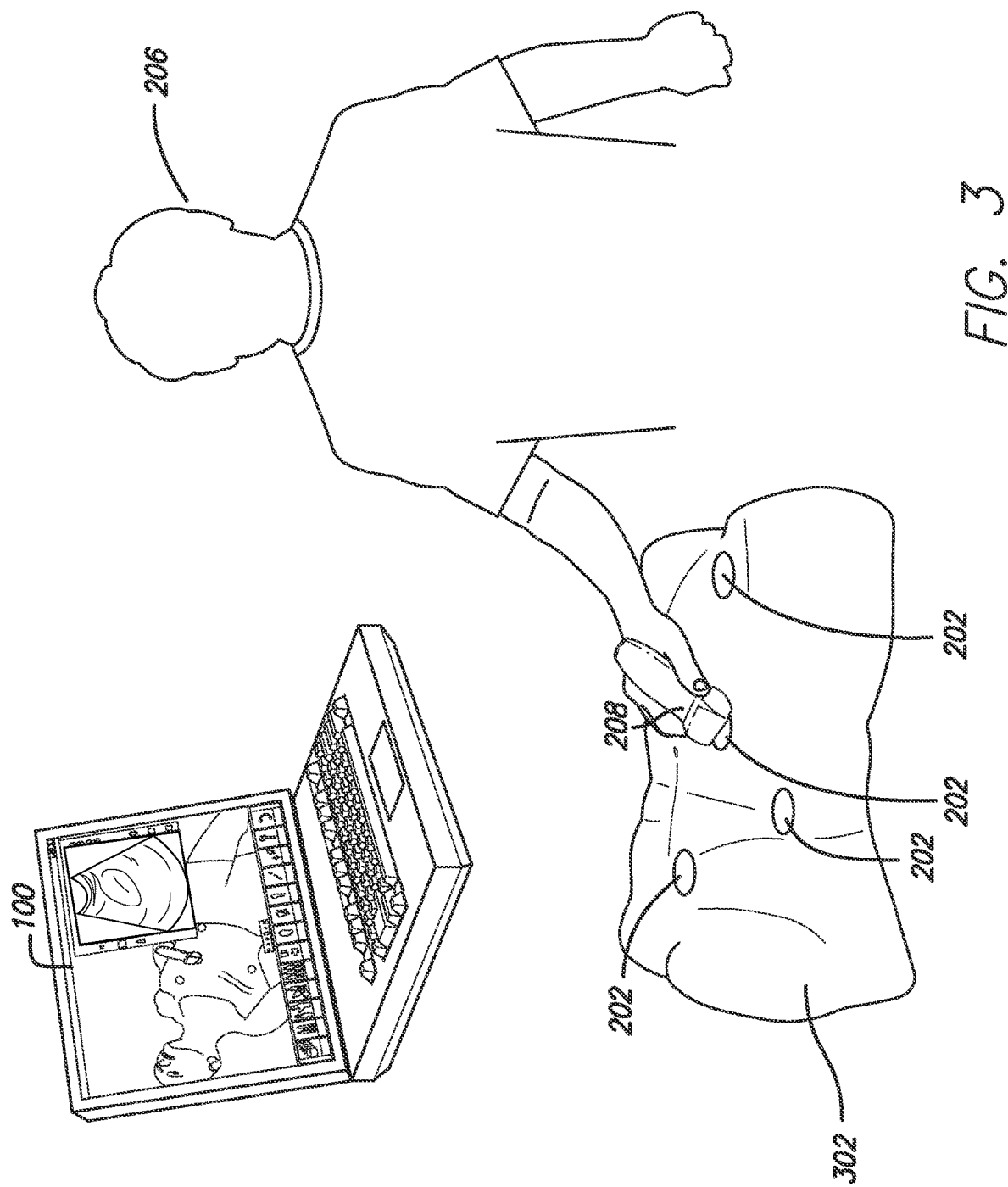
FIG. 3 shows a perspective view of a person training on an inanimate training mannequin in accordance with embodiments of the present disclosure.
Figure 4:
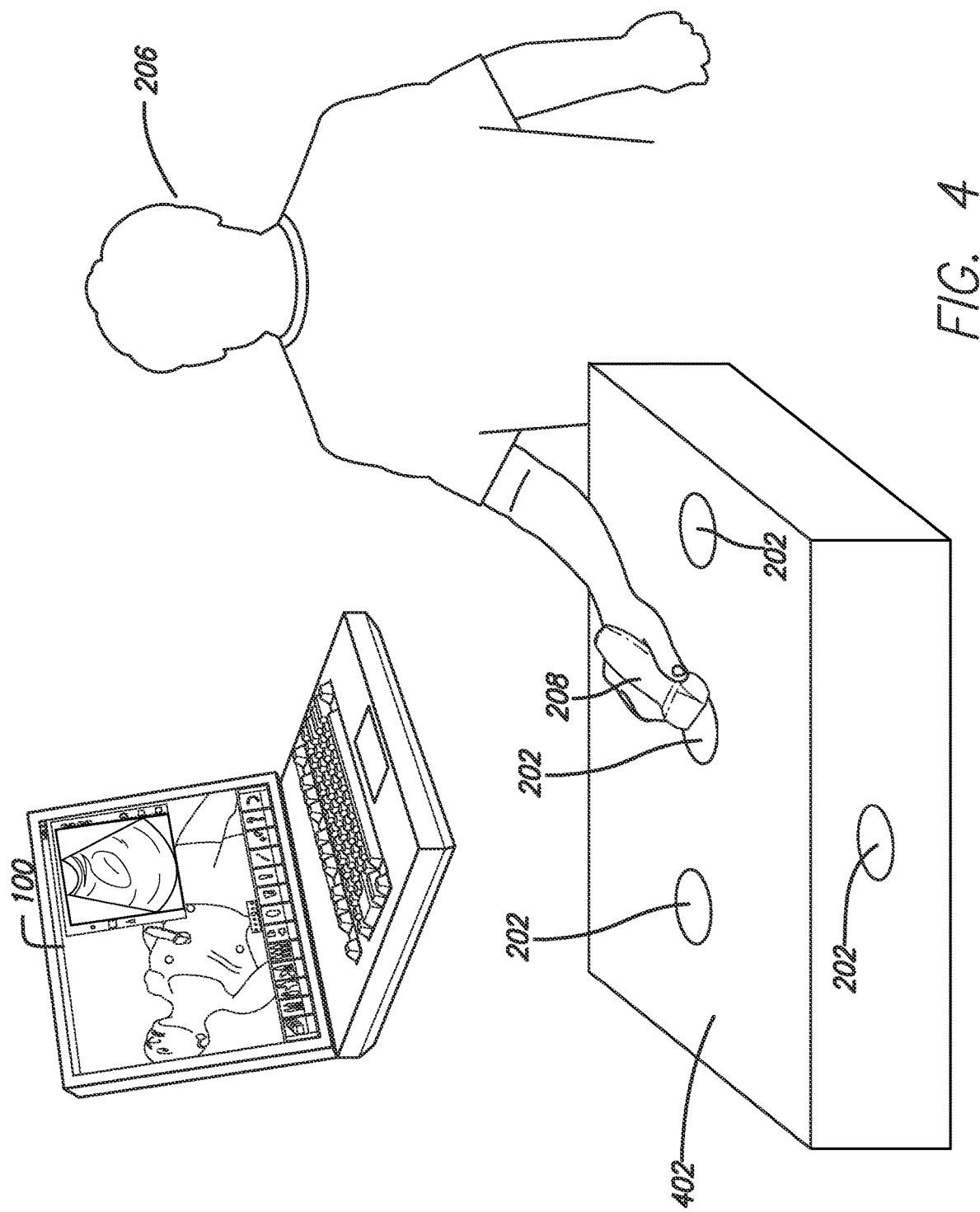
FIG. 4 shows a perspective view of a person training on an inanimate training object in accordance with embodiments of the present disclosure.
Figure 5:
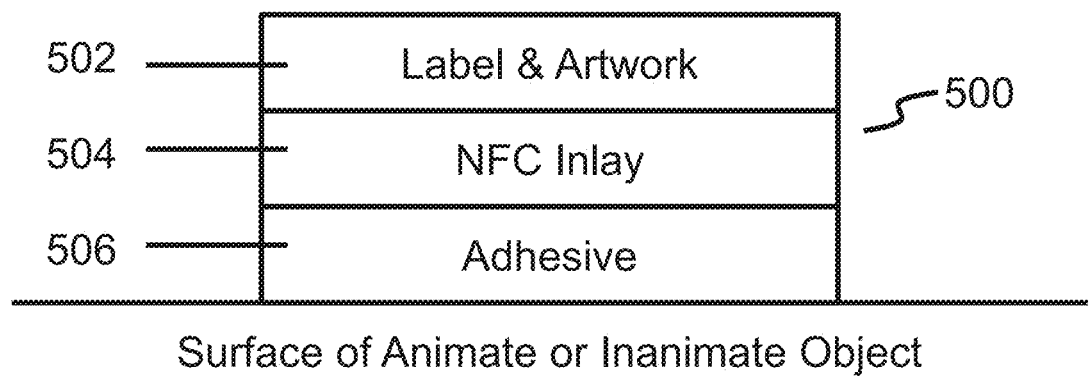
FIG. 5 shows a side view of a tag assembly in accordance with embodiments of the present disclosure.
Figure 6A:
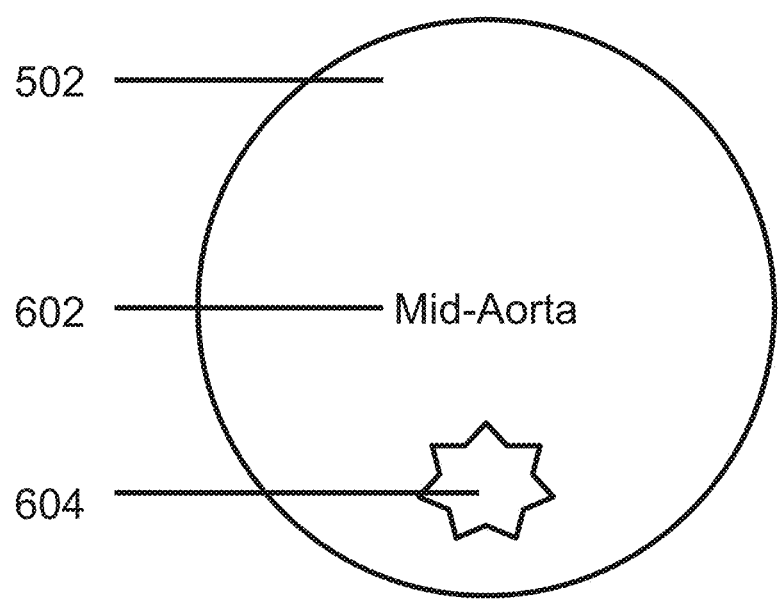
FIG. 6A shows a top view of a first layer of a tag assembly in accordance with embodiments of the present disclosure.
Figure 6B:
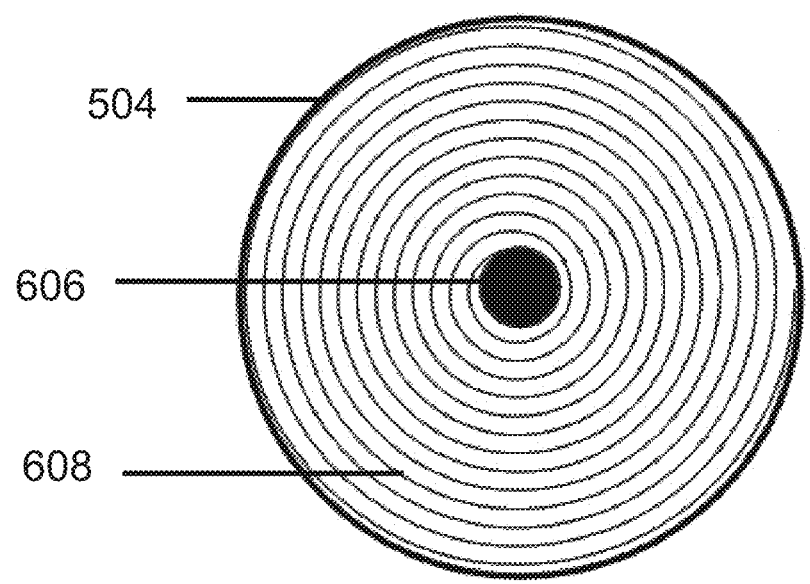
FIG. 6B shows a top view of a second layer of a tag assembly in accordance with embodiments of the present disclosure.
Figure 6C:
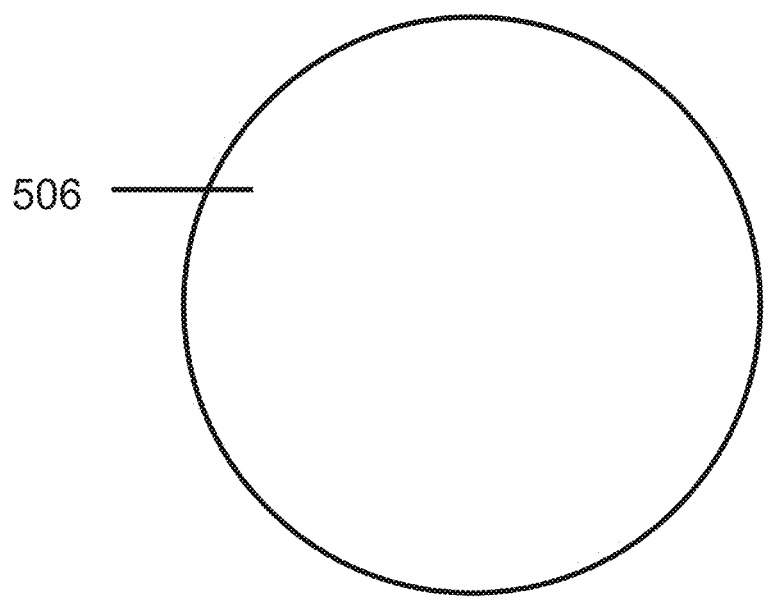
FIG. 6C shows a top view of a third of a tag assembly in accordance with embodiments of the present disclosure.

As discussed, the tags 202 may be used with animate or inanimate models/objects. In some embodiments, the animate training model 204 is a live human being, as shown in FIG. 2. In some embodiments, the inanimate training models are mannequins 302 of a human being or a portion of a human being, as shown in FIG. 3. In some embodiments, the inanimate object may be a simple structure 402, such as a box or a sheet of paper, as shown in FIG. 4. As demonstrated, the use of tags 202 allows the ultrasound training method to be flexible in use and cost. Further embodiments of training models may be used based on a desired type of simulation, such as to simulate different body types, body parts, animals, or other such factors.

In some embodiments, the tags 202 are labeled so that the user can easily identify where to affix the tags 202 on the animate or inanimate object. In some embodiments, the simulation software directs a user in the process of affixing the tags 202 on the animate or inanimate object. In some embodiments, the tags 202 may be provided already affixed to a training object so a trainee 206 does not need to worry about setting up or losing the tags 202.

The tags 202 should have an ID that is mapped to locations on the virtual body 108. The system needs to know how to establish a correspondence between the ID of a tag 202 and a set of coordinates on the virtual body 108. An example of a mapping may be:
  04087682922A81→Left Upper Quadrant→(12.34, 45.78, 74.57)
  040AB702BC2B80→Left Chest→(87.36, 29.15, 94.46)
  04107582922A81→Mid-Aorta→(73.82, 75.92, 40.24)

In preferred embodiments, the tags 202 are passive NFC tags 202, which are inexpensive, durable, and do not require a battery. Furthermore, NFC tags 202 may be read-only and read/write. If read/write tags 202 are available, the tags 202 can be programmed with a finite set of predefined IDs and the mapping between IDs and locations is hard-coded into the ultrasound simulation software. If the available tags 202 are read-only, the mapping must be defined between a large number of tags 202 with unique IDs and a finite set of labels 602. The number of available tags 202 is divided into multiple sets, where the size of each set matches the number of labels. A mapping between tags 202 and labels is defined and stored into a special file. The user will receive a set of tags 202 and a corresponding file that specifies the mapping of that set of tags 202 to locations on the virtual body.

The tags 202 are designed in a way that they may be easily affixed onto the training model either permanently or for a limited number of uses. If the tag is designed to be affixed permanently to an object, such as a training mannequin 302, they could be embedded directly by the manufacturer. For instance, if a training mannequin 302 features a soft removable skin, the tags 202 could be embedded directly under the skin at the correct locations.

In some embodiments, the tag 202 may be a tag assembly 500 comprising multiple superimposed layers. An example tag assembly 500 having three layers is illustrated in FIG. 5 and FIGS. 6A-6C. The first layer may be a Label and Artwork layer 502 that indicates the location on the virtual body 108 the tag 202 corresponds to with a label 602. This layer may also showcase additional graphics 604 for branding and improving the appearance of the tag. The second layer may be a NFC inlay layer 504 that hosts NFC hardware, which in many cases comprises an integrated circuit 606 and antenna 608 laid out on a flat surface. The third layer may be an Adhesive layer 506, wherein the surface is designed to adhere to the animate and inanimate object. The contact surface of this layer should be covered with an appropriate adhesive to facilitate affixing the tag onto the object. In some embodiments, additional layers may be superimposed to further protect the tag 202 against mechanical stresses, liquids or other hazards the tag 202 may be exposed to.

The reader detects tags 202 over a short distance by employing a number of available radio frequency technologies depending on the type of tag. In preferred embodiments, a low-cost NFC reader and passive NFC tags 202 are used. The NFC reader broadcasts an electromagnetic (EM) wave at a specific frequency. The NFC tag 202 harvests energy from the incoming EM wave using magnetic induction. The tag 202 uses the energy to power a small chip 606 that broadcasts a new EM wave that encodes the unique identification number of the tag 202 according to a predefined protocol. The NFC reader then receives the encoded signal and relays the information to the computation engine.

The rotational 3-DOF motion tracker may comprise one or more sensors for measuring rotation. For example, the motion tracker may comprise a low-cost Inertial Measurement Unit (IMU) composed of a combination of gyroscopes, accelerometers, magnetometers, and other sensors for compensating external disturbances.

Figure 7:
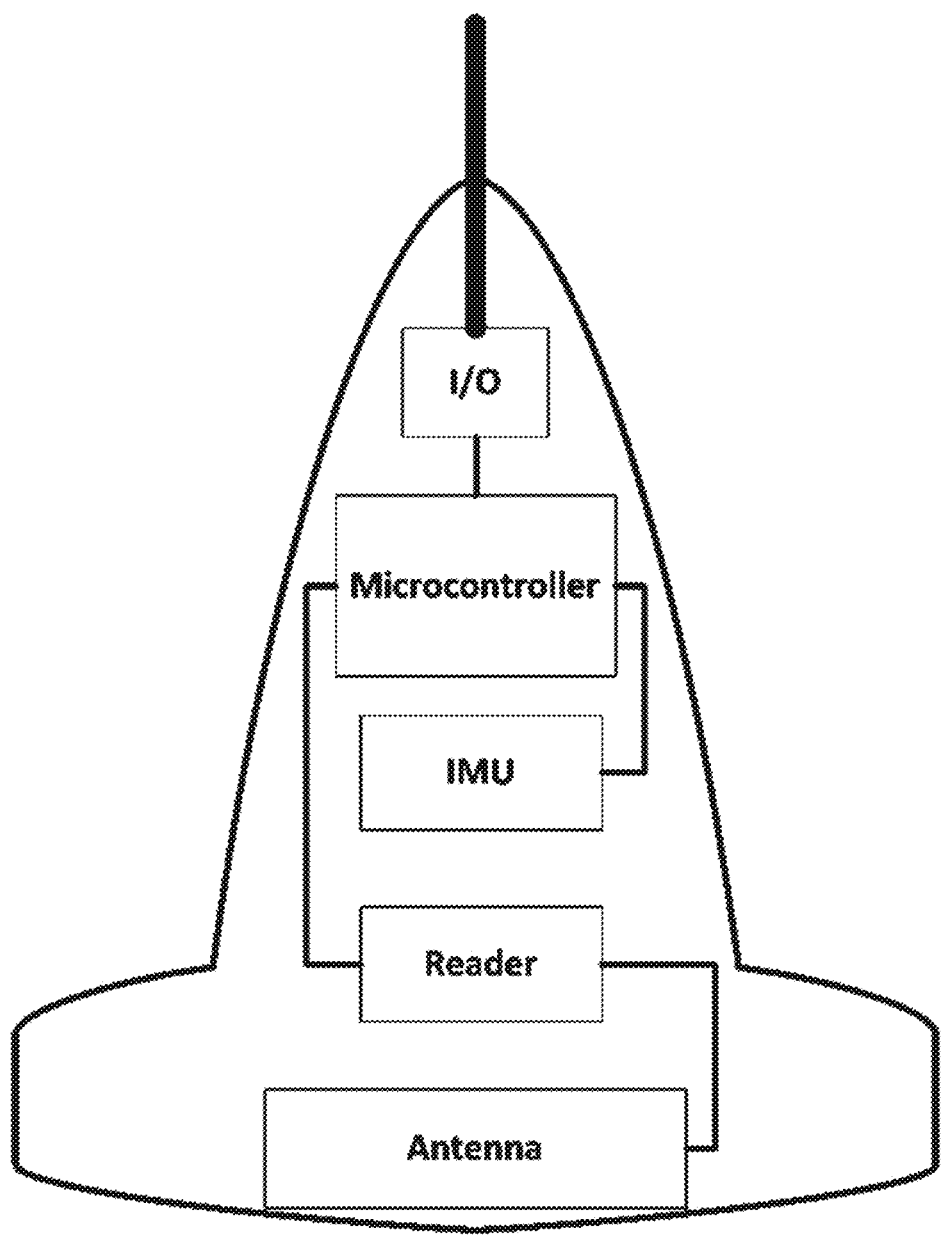
FIG. 7 shows a high level block diagram of a sensor assembly in accordance with embodiments of the present disclosure.

In some embodiments, the reader and the rotational 3-DOF motion tracker are combined into a single unit called a sensor assembly 208, as shown in FIG. 7. The sensor assembly 208 can be used to control the orientation of the scanning plane of an ultrasound device in a virtual environment 106 and detect ID of a labeled tag 202 and convey it to the computation engine that runs the ultrasound simulation.

The system requires a computing device capable of running the ultrasound simulation software. The ultrasound simulation software should be capable of displaying on a display a graphical user interface (GUI) 104, a virtual body 108, a virtual probe 110, and a dynamic image 102 resembling the appearance of an ultrasound. The computing device should be capable of receiving data from a sensor assembly, including an identified tag and an orientation. The position and orientation of the virtual probe 110 should update based on the data, and the dynamic image 102 should also change.

The ultrasound simulation software may include instructions on placing tags 202 on an animate or inanimate model/object. The ultrasound simulation software may also include a choice of different virtual bodies 108. For example, practitioners may be given a choice to practice ultrasound training on an average male, a pregnant female, or a pet dog. In some embodiments, the instructions on placing tags 202 are dependent on the body type chosen in the ultrasound simulation software.

The ultrasound simulation software may further include scenarios, objectives and instructions on obtaining an image window or optimal image view. For example, a scenario may involve instructing a trainee 206 to place a sensor assembly at the abdomen of the model. If the trainee 206 does not find the correct tag 202, the scenario will not progress. This may instruct a trainee 206 in finding the correct image window. The scenario may then instruct the trainee 206 to find the optimal image view. The trainee 206 will need to orient the sensor assembly at the right orientation to progress. In some embodiments, a specific virtual probe position will be displayed on the computing device, which a trainee 206 will be required to mimic.

Figure 8:
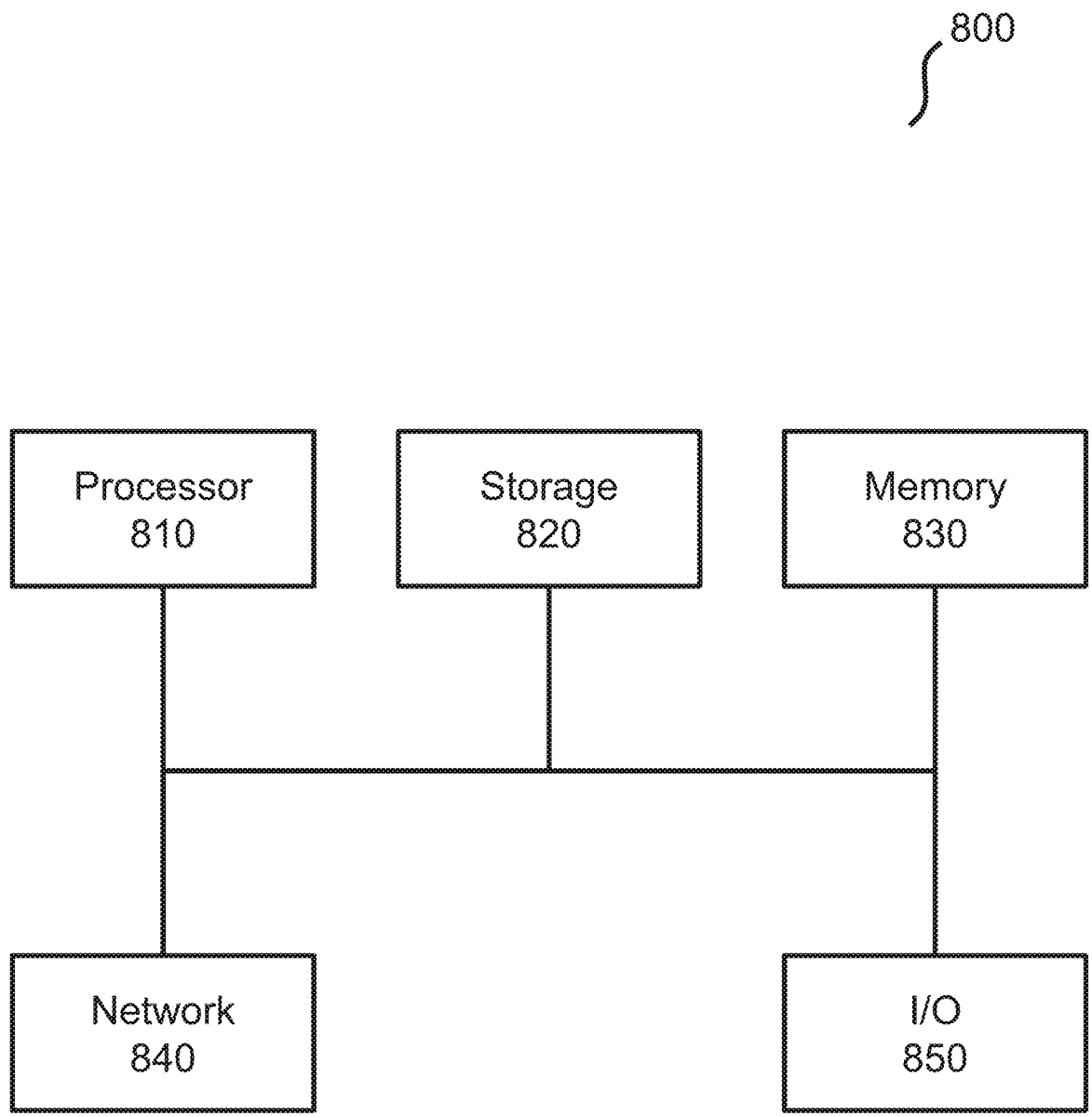
FIG. 8 shows a high level block diagram of a computing device in accordance with embodiments of the present disclosure.

A high-level block diagram of an exemplary computing device 800 that may be used to implement systems, apparatus, and methods described herein is illustrated in FIG. 8. The computing device 800 comprises a processor 810 operatively coupled to a data storage device and memory. Processor 810 controls the overall operation of computing device 800 by executing computing device program instructions that define such operations. The computing device program instructions may be stored in data storage device 820, or other non-transitory computing device readable medium, and loaded into memory 830 when execution of the computing device program instructions is desired. Thus, the method steps of the ultrasound simulation software can be defined by the computing device program instructions stored in memory 830 and/or data storage device 820 and controlled by processor 810 executing the computing device program instructions.

Computing device 800 also includes one or more network interfaces 840 for communicating with other devices via a network. Computing device 800 also includes one or more input/output devices 850 that enable user interaction with computing device 800 (e.g., display, keyboard, touchpad, mouse, speakers, buttons, etc.).

Processor 810 can include, among others, special purpose processors with software instructions incorporated in the processor design and general purpose processors with instructions in storage device 820 or memory 830, to control the processor 810, and may be the sole processor or one of multiple processors of computing device 800. Processor 810 may be a self-contained computing system, containing multiple cores or processors, a bus, memory controller, cache, etc. A multi-core processor may be symmetric or asymmetric. Processor 810, data storage device 820, and/or memory 830 may include, be supplemented by, or incorporated in, one or more application-specific integrated circuits (ASICs) and/or one or more field programmable gate arrays (FPGAs). It can be appreciated that the disclosure may operate on a computing device 800 with one or more processors 810 or on a group or cluster of computing devices networked together to provide greater processing capability.

Data storage device 820 and memory 830 each comprise a tangible non-transitory computing device readable storage medium. By way of example, and not limitation, such non-transitory computing device-readable storage medium can include random access memory (RAM), high-speed random access memory (DRAM), static random access memory (SRAM), double data rate synchronous dynamic random access memory (DDRRAM), read-only memory (ROM), erasable programmable read-only memory (EPROM), electrically erasable programmable read-only memory (EEPROM), flash memory, compact disc read-only memory (CD-ROM) digital versatile disc read-only memory (DVD-ROM) disks, or other optical disk storage, magnetic disk storage or other magnetic storage devices, or any other medium which can be used to carry or store desired program code means in the form of computing device-executable instructions, data structures, or processor chip design. When information is transferred or provided over a network or another communications connection (either hardwired, wireless, or combination thereof) to a computing device, the computing device properly views the connection as a computing device-readable medium. Thus, any such connection is properly termed a computing device-readable medium. Combinations of the above should also be included within the scope of the computing device-readable media.

Network/communication interface 840 enables the computing device 800 to communicate with networks, such as the Internet, also referred to as the World Wide Web (WWW), an intranet and/or a wireless network, such as a cellular telephone network, a wireless local area network (LAN) and/or a metropolitan area network (MAN), and other devices using any suitable communications standards, protocols, and technologies. By way of example, and not limitation, such suitable communications standards, protocols, and technologies can include Ethernet, Wi-Fi (e.g., IEEE 802.11), Wi-MAX (e.g., 802.16), Bluetooth, near field communications ("NFC"), radio frequency systems, infrared, GSM, EDGE, HS-DPA, CDMA, TDMA, quadband, VoIP, IMAP, POP, XMPP, SIMPLE, IMPS, SMS, or any other suitable communications protocols. By way of example, and not limitation, the network interface 840 enables the computing device 800 to transfer data, synchronize information, update software, or perform any other suitable operation.

Input/output devices 850 may include peripherals, such as the sensor assembly or the individual reader and motion tracker. Input/output devices 850 may also include monitors or touchscreens for display, a keyboard and mouse for input, speakers for audio output, and other such devices.

Any or all of the systems and apparatus discussed herein, including personal computing devices, tablet computing devices, hand-held devices, cellular telephones, servers, database, cloud-computing environments, and components thereof, may be implemented using a computing device such as computing device 800.

One skilled in the art will recognize that an implementation of an actual computing device or computing device system may have other structures and may contain other components as well, and that FIG. 8 is a high level representation of some of the components of such a computing device for illustrative purposes.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

What is claimed is:

1. A system for extended spectrum ultrasound training comprising:
   a plurality of radio frequency tags;
   a sensor assembly comprising:
     a reader for identifying at least one of the plurality of radio frequency tags; and
     a sensor for measuring an angular orientation of the sensor assembly;
   a computation engine, comprising:
     a display;
     a processor;
     a memory; and
     a program, wherein the program is stored in the memory and configured to be executed by the processor, the program including instructions to:
     receive data from the sensor assembly, wherein the data comprises the angular orientation of the sensor assembly and an identification of the at least one of the plurality of radio frequency tags;
     determine a location of the at least one of the plurality of radio frequency tags based on a set of coordinates associated with the at least one of the plurality of radio frequency tags;
     display a virtual body;
     display a virtual ultrasound probe, wherein the virtual ultrasound probe has an orientation corresponding to the angular orientation of the sensor assembly, and wherein the virtual ultrasound probe is positioned at a virtual body location corresponding to the at least one of the plurality of radio frequency tags identified by the sensor assembly; and
     generate and display a virtual ultrasound based on the virtual body and the virtual ultrasound probe.

2. The system of claim 1, wherein the program further includes instructions to:
   instruct a user to move the sensor assembly to a particular radio frequency tag for practicing locating an image window; and
   instruct the user to move the sensor assembly to a particular angular orientation for practicing finding an optimal image view.

3. A method for training practitioners in ultrasound skills, comprising:
   receiving information encoded in a passive NFC tag by a NFC reader;
   measuring rotation of a motion tracker;
   displaying a virtual body on a display device;
   displaying a virtual ultrasound probe on the display device, wherein the virtual ultrasound probe has an orientation determined by the motion tracker, and wherein the virtual ultrasound probe has a translational position relative to the virtual body determined by the tag;
   displaying an ultrasound scan of the virtual body based on the translational position and the orientation of the virtual ultrasound probe on the virtual body; and
   measuring translational movement of the motion tracker based on a set of coordinates associated with the tag.

4. The method of claim 3, further comprising instructing at least one placement location of the tag on a model.

5. The method of claim 4, wherein the NFC reader and the motion tracker are housed in a handheld sensor assembly.

6. The method of claim 5, wherein the model is an animate body.

7. The method of claim 5, wherein the model is an inanimate object.

8. The method of claim 5, further comprising instructing a user to move the NFC reader to a particular tag in order to train in finding an image window.

9. The method of claim 8, further comprising instructing the user to move the motion tracker to a particular orientation to train in finding an optimal view.

10. The method of claim 9, wherein a user interface provides a choice of types of virtual bodies.

11. A system for training practitioners in ultrasound skills, comprising:
    a tag, comprising an identification;
    a reader configured to read the tag;
    a motion tracker;
    a computation engine comprising:
      a display device;
      at least one processor;
      a memory; and
      at least one program, wherein the at least one program is stored in the memory and configured to be executed by the at least one processor, the at least one program including instructions to:
      determine a location of the tag based on the identification of the tag by the reader;
      receive an orientation data of the motion tracker regarding an orientation of the motion tracker;
      display a virtual body on the display device;
      display a virtual ultrasound probe on the display device, wherein the virtual ultrasound probe has an orientation corresponding to the orientation of the motion tracker, and wherein the virtual ultrasound probe is positioned at a location on the virtual body corresponding to the location of the tag; and display an ultrasound scan of the virtual body based on the orientation and location of the virtual ultrasound probe.

12. The system of claim 11, wherein the reader and the motion tracker are housed in a handheld sensor assembly.

13. The system of claim 12, wherein the tag is a passive NFC tag, and wherein the reader is a NFC reader.

14. The system of claim 13, wherein the tag comprises:
an identification layer indicating the location on the virtual body with which the tag corresponds;
a NFC layer comprising a integrated circuit and antenna; and
an adhesive layer to adhere to a training object.

15. The system of claim 12, further comprising an inanimate mannequin, wherein the inanimate mannequin has indicators for where to place the tag.

16. The system of claim 15, wherein the at least one program further comprises instructions to move the handheld sensor assembly to a particular tag for training in finding an image window.

17. The system of claim 16, wherein the at least one program further comprises instructions to orient the motion tracker to a particular orientation for training in finding an optimal view.

18. The system of claim 12, wherein the at least one program provides instructions to provide a user selection of virtual body types.

19. The system of claim 18, wherein the at least one program provides instructions to place the tag based on the user selection of virtual body types.

* * * * *